(12) United States Patent
Momoki (10) Patent No.: US 6,919,998 B2
(45) Date of Patent: Jul. 19, 2005

(54) OBSERVATION OPTICAL SYSTEM AND OBSERVATION DEVICE

(75) Inventor: Kazuhiko Momoki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/092,892

(22) Filed: Mar. 6, 2002

(65) Prior Publication Data

US 2003/0016453 A1 Jan. 23, 2003

(30) Foreign Application Priority Data

Mar. 9, 2001 (JP) ........................................ 2001-067154

(51) Int. Cl.[7] ............................ G02B 9/04; G02B 15/14
(52) U.S. Cl. .................... 359/793; 359/691; 359/680
(58) Field of Search ................................ 359/793, 680, 359/682, 687, 688, 691, 785, 781, 782, 783, 775, 774, 768

(56) References Cited

U.S. PATENT DOCUMENTS

| | | | |
|---|---|---|---|
| 2,985,071 A | * | 5/1961 | Becker ....................... 359/768 |
| 3,942,862 A | | 3/1976 | Furukawa et al. |
| 4,906,078 A | * | 3/1990 | Inabata et al. .............. 359/680 |
| 5,617,159 A | * | 4/1997 | Sakagami et al. ............ 396/55 |
| 5,917,663 A | | 6/1999 | Suzuki |
| 6,249,380 B1 | | 6/2001 | Yano .......................... 359/557 |
| 6,339,509 B1 | * | 1/2002 | Ohtake ....................... 359/689 |
| 6,377,305 B2 | * | 4/2002 | Onuki ........................ 348/345 |
| 6,377,399 B1 | * | 4/2002 | Yanari ........................ 359/557 |

FOREIGN PATENT DOCUMENTS

| | | |
|---|---|---|
| JP | 10-186228 | 7/1998 |
| JP | 2000-352664 | 12/2000 |

* cited by examiner

*Primary Examiner*—Tim Thompson
(74) *Attorney, Agent, or Firm*—Morgan & Finnegan, LLP (57) ABSTRACT

An observation optical system including an objective optical part which forms an image of an object, an image inverting part which converts an image formed by said objective optical part into an erect image, and an eyepiece optical part which guides the erect image converted by said image inverting part to an observer. The objective optical part has a first lens unit with a negative power and a second lens unit with a positive power arranged from an object side in the order named, and said second lens unit is movable in a direction including a component perpendicular to an optical axis to stabilize an image.

8 Claims, 12 Drawing Sheets

OBSERVATION OPTICAL SYSTEM AND OBSERVATION DEVICE

BACKGROUND OF THE INVENTION

1. Field of the Invention

The present invention relates to an observation optical system used for an observation device having an antivibration function, such as a telescope or binocular.

2. Related Background Art

As an observation optical system for an observation device such as a telescope or binocular, an observation optical system having an antivibration function is disclosed in, for example, Japanese Patent Application Laid-Open No. 10-186228.

This observation optical system has an objective optical system having a first lens unit with a positive power (the reciprocal of the focal length) and a second lens unit with a negative power arranged from the object side in the order named, and the second lens unit is driven in a direction perpendicular to the optical axis to effect the antivibration function.

The above objective optical system has a so-called telephoto type arrangement, which is characterized in that the total length of the objective optical system can be shortened.

In the observation optical system, however, an image inverting system such as an image inverting prism must be placed between the objective optical system and the eyepiece optical system, and a driving mechanism for antivibration must be placed inside the objective optical system. Since they require a certain space, the merit of shortening the optical system by making the objective optical system into a telephoto type system is low.

In this case, in driving the second lens unit of the two-unit optical system to effect the antivibration function, an antivibration sensitivity Si is expressed by the following equation using a magnification $\beta$ of the second lens unit:

$$Si = (1-\beta)$$

In the arrangement having positive and negative lens units arranged from the object side in the order named, since $\beta > 1$, and hence in order to realize $|Si| > 1$, $\beta > 2$ needs to be set. This arrangement is not so advantageous in terms of sensitivity. An increase in sensitivity can be attained by increasing $\beta$ of the second lens unit. However, since the power ratio between the positive and negative lens units excessively increases, many lenses are required for aberration correction.

The arrangement disclosed in Japanese Patent Application Laid-Open No. 2000-352664 (corresponding to U.S. Pat. No. 6,249,380B1) has an objective lens system having a first lens unit with a positive power and a second lens unit with a positive power arranged from the object side in the order named. The second lens unit is driven in a direction perpendicular to the optical system to effect an antivibration function.

The total length of this objective optical system is longer than the focal length of the objective optical system. This makes it possible to ensure a space for an image inverting prism and the like. In addition, a space for an antivibration driving mechanism can be easily ensured.

In the arrangement disclosed in Japanese Patent Application Laid-Open No. 2000-352664, however, the magnification $\beta$ of the second lens unit falls within the range of $0 < \beta < 1$, and hence the absolute value of the antivibration sensitivity Si in driving the second lens unit becomes smaller than 1 as indicated by the following equation. It is therefore theoretically impossible to increase the antivibration sensitivity.

$$|Si| = |1-\beta| < 1$$

SUMMARY OF THE INVENTION

It is an object of the present invention to provide an observation optical system which has an objective optical system having a high antivibration sensitivity while ensuring a space for an image inverting system, antivibration driving mechanism, and the like between the objective optical system and an eyepiece optical system and can obtain good optical performance with a lens arrangement constituted by a small number of lenses.

In order to achieve the above object, according to the present invention, there is provided an observation optical system including an objective optical part which forms an image of an object, an image inverting part which converts an image formed by the objective optical part into an erect image, and an eyepiece optical part which guides the erect image converted by the image inverting part to an observer, wherein the objective optical part has a first lens unit with a negative power and a second lens unit with a positive power arranged from an object side in the order named, and the second lens unit is movable in a direction that includes a component perpendicular to an optical axis to stabilize an image.

DESCRIPTION OF THE PREFERRED EMBODIMENTS

Figure 1:
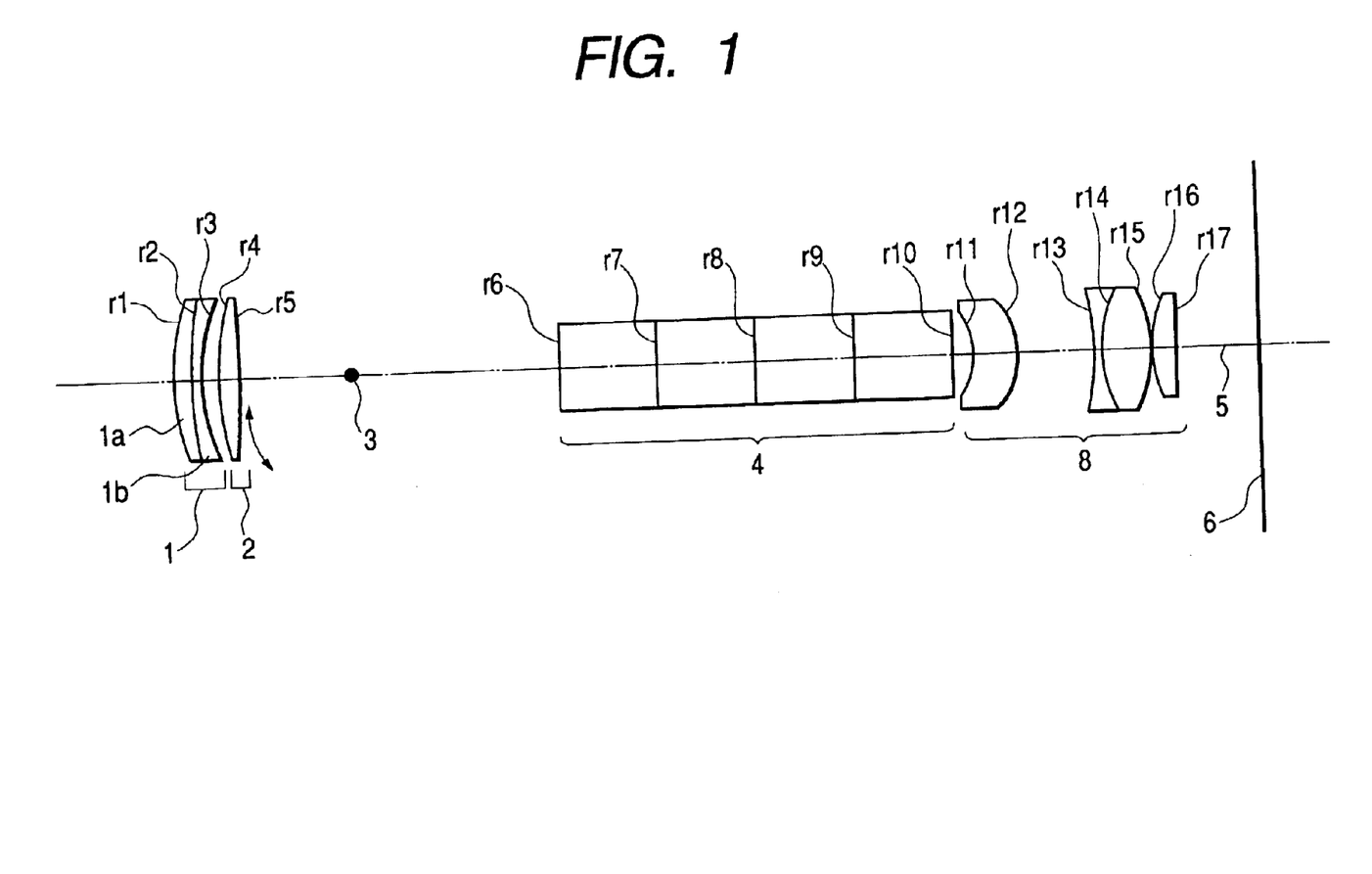
FIG. 1 is a sectional view showing an observation optical system according to numerical embodiment 1 in an embodiment of the present invention.
Figure 2:
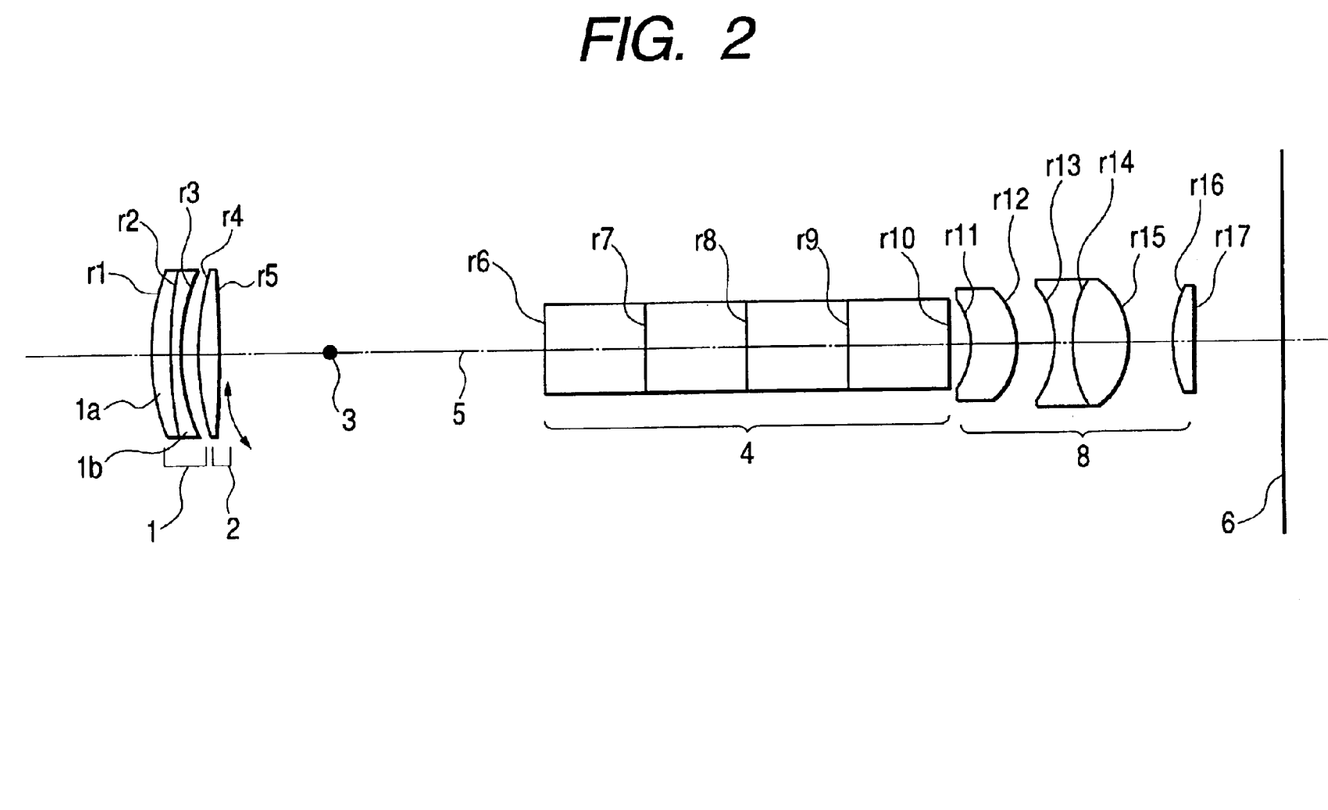
FIG. 2 is a sectional view showing an observation optical system according to numerical embodiment 2 in the embodiment of the present invention.
Figure 3:
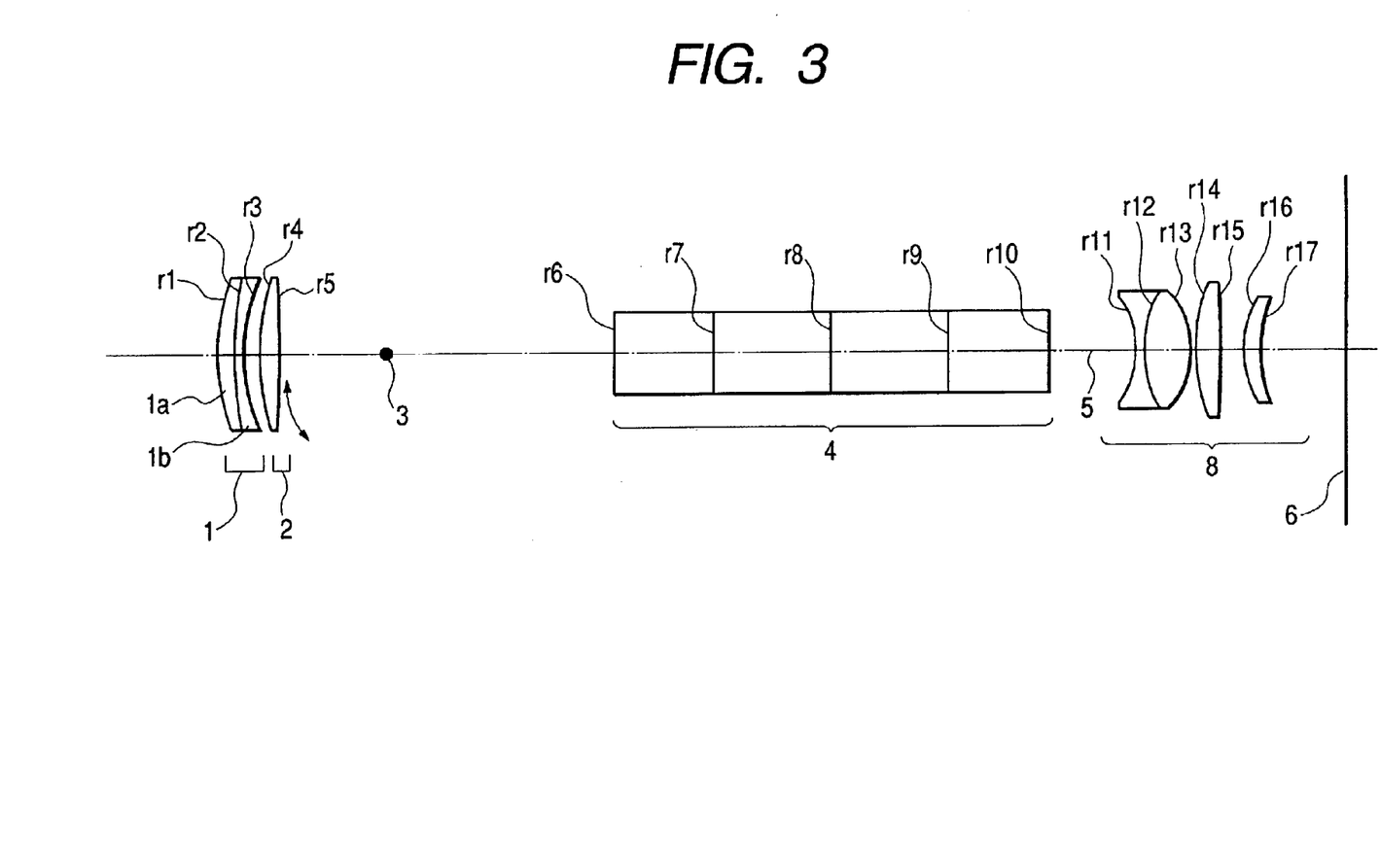
FIG. 3 is a sectional view showing an observation optical system according to numerical embodiment 3 in the embodiment of the present invention.
Figure 4:
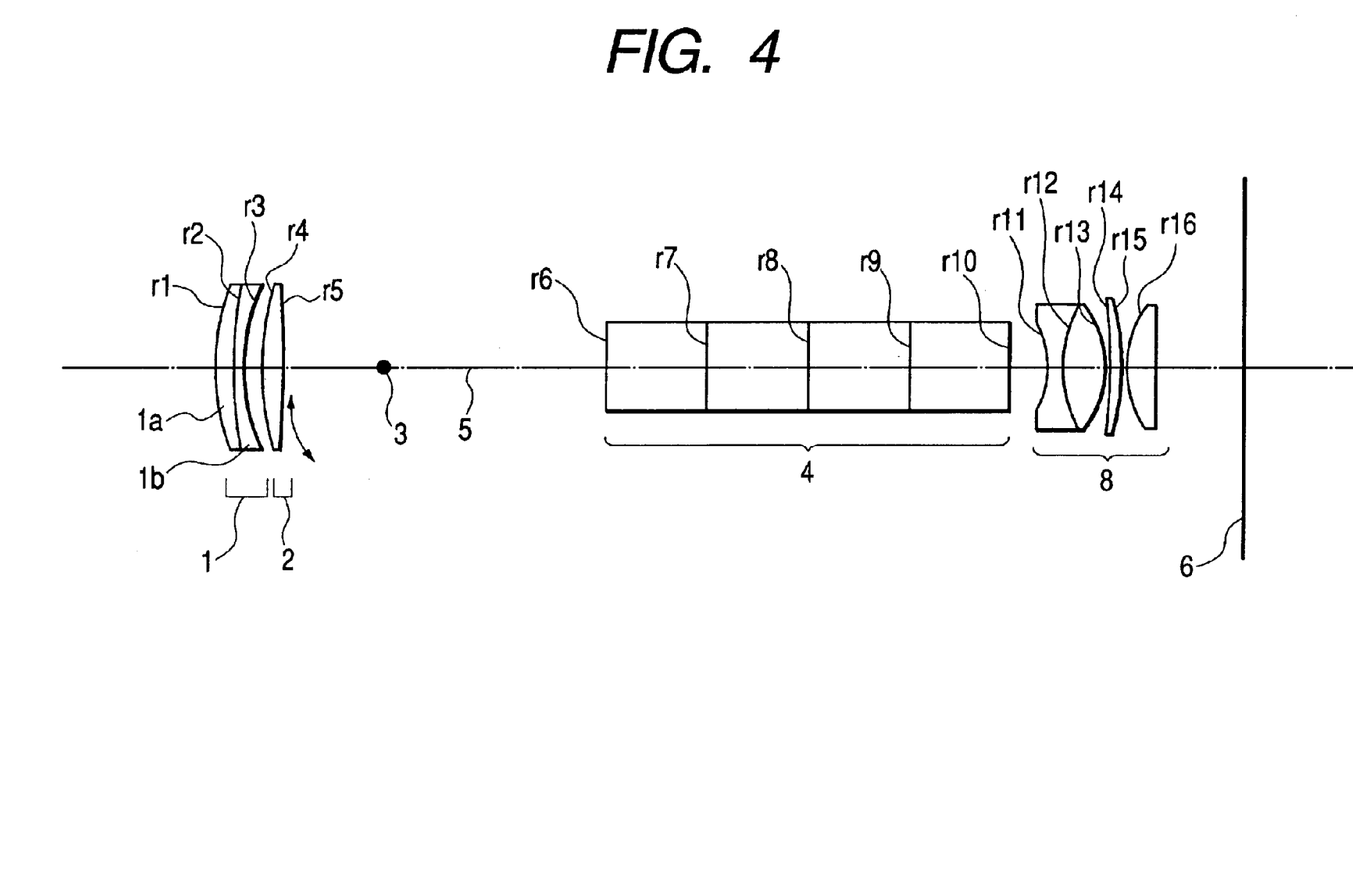
FIG. 4 is a sectional view showing an observation optical system according to numerical embodiment 4 in the embodiment of the present invention.
Figure 5:
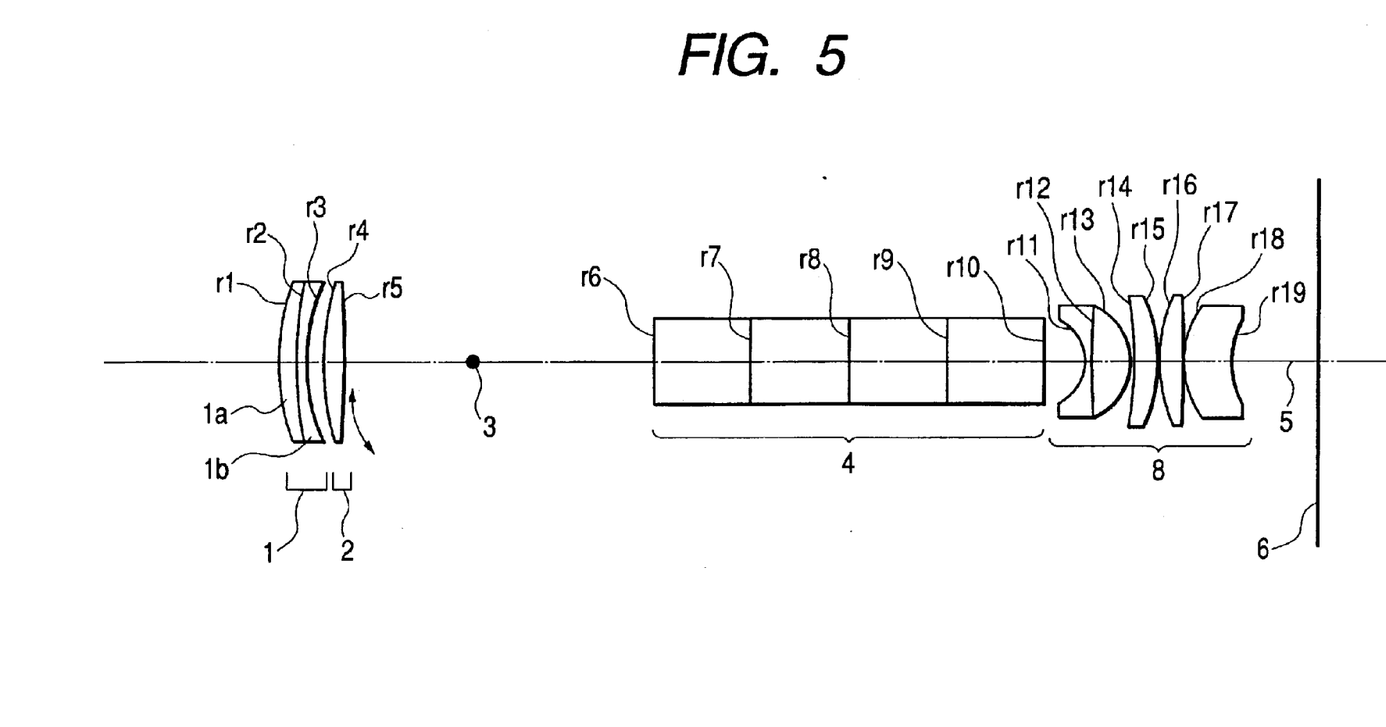
FIG. 5 is a sectional view showing an observation optical system according to numerical embodiment 5 in the embodiment of the present invention.
Figure 6:
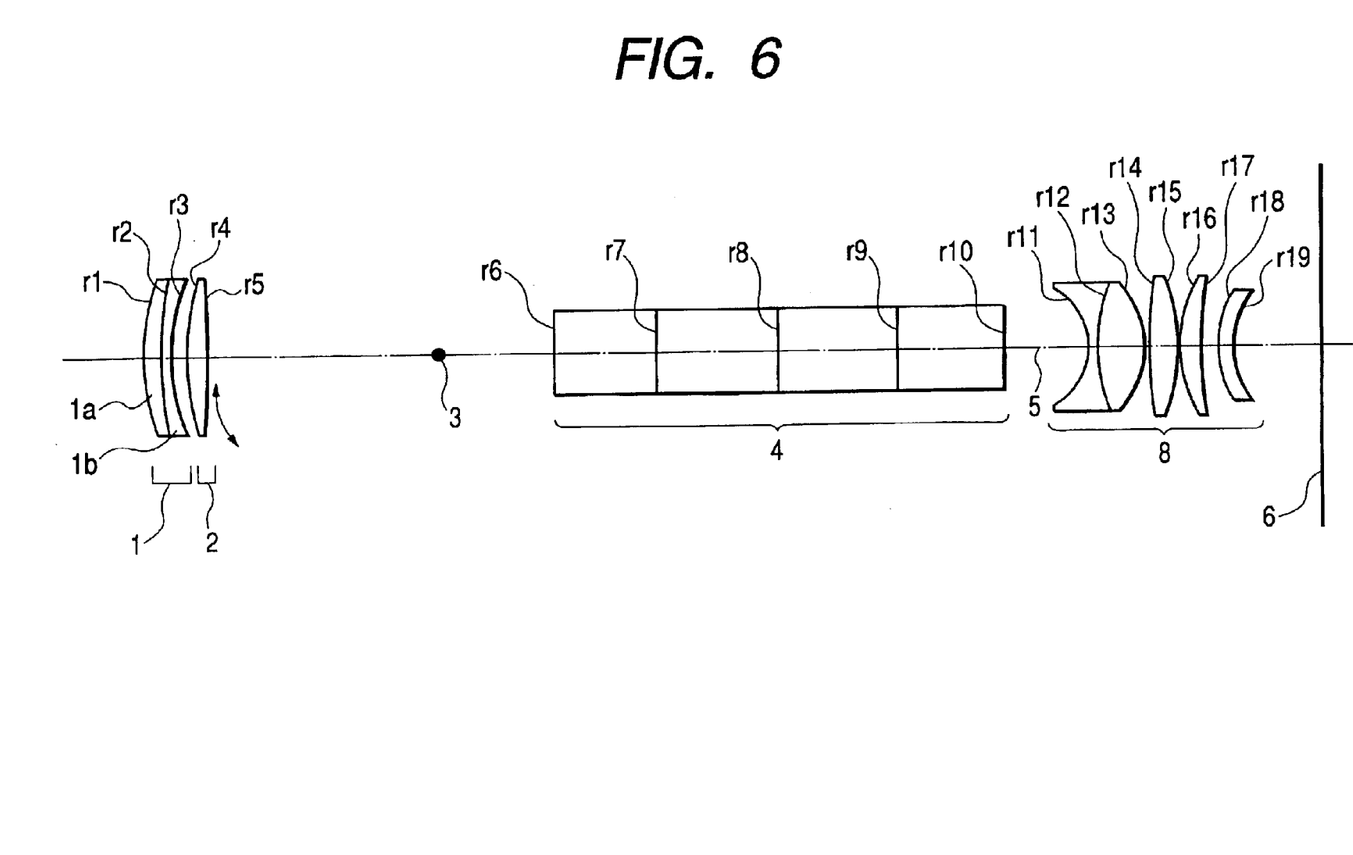
FIG. 6 is a sectional view showing an observation optical system according to numerical embodiment 6 in the embodiment of the present invention.

FIGS. 1 to 6 show the arrangements of observation optical systems based on numerical embodiments 1 to 6 according to an embodiment of the present invention.

Referring to FIGS. 1 to 6, a first lens unit 1 has a negative power (=reciprocal of focal length), and a second lens unit 2 has a positive power. A point 3 on an optical axis 5 indicated by the chain line in each drawing serves as a swing center when the second lens unit 2 is driven for antivibration.

Note that an objective lens part is comprised of the first and second lens units 1 and 2. An image-erecting prism 4 is part of an image inverting part and formed by, for example, a Porro prism or Pechan roof prism. An eyepiece part 8 is comprised of a plurality of lenses. An observation optical system is comprised of the objective lens part, image inverting part, and eyepiece part. Reference numeral 6 denotes a pupil plane of an observer.

In this embodiment, as described above, the objective lens part is comprised of the first lens unit 1 having a negative power and the second lens unit 2 having a positive power which are sequentially arranged from the object side.

By forming an objective optical system having negative and positive lens units arranged from the object side in the order named in this manner, the total length of the objective optical system becomes longer than the focal length of the objective optical system. This makes it possible to ensure a space large enough to arrange an image inverting system such as an image inverting prism and the like, an antivibration driving mechanism, and the like between the objective optical system and the eyepiece optical system. In addition, since the magnification of the second lens unit is represented by $\beta<0$, an antivibration sensitivity Si is given by $$|Si|=|1-\beta|>1$$

Therefore, this arrangement is more advantageous in obtaining a high antivibration sensitivity than an arrangement using an objective optical system having positive and negative lens units or positive and positive lens units from the object side in the order named.

In this embodiment, the first lens unit 1 is comprised of a positive lens 1a and negative lens 1b arranged from the object side in the order named.

The second lens unit 2 is formed by a single lens (positive lens) having a positive power.

In this embodiment, letting Fo be the focal length of the overall objective lens part, f1 be the focal length of the first lens unit 1, f2 be the focal length of the second lens unit 2, and D12 be the distance between the first lens unit 1 and the second lens unit 2, the first and second lens units 1 and 2 are designed to satisfy $$0.1 \leq -Fo/f1 \leq 1.0 \quad (1)$$

$$1.1 \leq Fo/f2 \leq 3.0 \quad (2)$$

$$0.01 \leq D12/Fo \leq 0.2 \quad (3)$$

Conditional expression (1) indicates the ratio between the focal length of the first lens unit 1 and the focal length of the overall objective lens part. If the power of the first lens unit 1 is reduced below the lower limit of conditional expression (1), the effect of increasing the total length of the objective lens part and the effect of improving the antivibration effect are lost. If the power of the first lens unit 1 is increased to exceed the upper limit of conditional expression (1), it becomes difficult to correct aberrations such as spherical aberration and curvature of field, and the total length of the objective lens part becomes too long.

Conditional expression (2) indicates the ratio between the focal length of the second lens unit 2 and the focal length of the objective lens part. If the power of the second lens unit 2 is reduced below the lower limit of conditional expression (2), the effect of increasing the total length of the objective lens part and the effect of improving the antivibration effect are lost. If the power of the second lens unit 2 is increased to exceed the upper limit of conditional expression (2), it becomes difficult to correct aberrations such as spherical aberration and curvature of field. In addition, as in this embodiment, if the power of the second lens unit 2 formed by one positive lens is increased, since the thickness and weight of the lens increase, the power consumption for antivibration driving increases.

Conditional expression (3) is associated with the ratio between the focal length of the overall objective lens part and the distance (air gap) between the first lens unit 1 and the second lens unit 2. If the first lens unit 1 is brought much close to the second lens unit 2 to exceed the lower limit of conditional expression (3), the space for antivibration driving becomes insufficient. This may cause interference between the two units. If the distance exceeds the upper limit, since a divergent light beam emerges from the first lens unit 1, the second lens unit 2 needs to have a large effective diameter accordingly. As a result, the power consumption for antivibration driving increases.

In the observation optical system according to this embodiment, the second lens unit 2 is swung/driven about the point 3 on the optical axis to prevent image blur due to so-called hand vibrations and the like in an observation device such as a binocular or telescope incorporating this observation optical system.

Letting Tc be the distance from the vertex of the object-side surface of the second lens unit 2 to the swing center (when the direction on the image surface side is a positive direction, and the direction on the object side is a negative direction), the position of the swing center 3 is set to satisfy $$0.1 \leq Tc/Fo \leq 0.7 \quad (4)$$

Conditional expression (4) is associated with the position 3 of the swing center when the antivibration function is effected by swinging/driving the second lens unit 2 about the point 3 on the optical axis. By satisfying this condition, the effect of correcting the aberrations caused in antivibration operation, decentered coma and decentered curvature of field, in particular, can be obtained. In consideration of the swinging mechanism of the second lens unit 2, the swing center 3 is preferably located at a position that is closer to the image side than the objective lens part and closer to the object side than the image inverting part.

If the swing center 3 is brought close to the second lens unit 2 below the lower limit of conditional expression (4), decentered aberrations are excessively corrected. In addition, since the rotational angle required for driving increases, the antivibration mechanism becomes undesirably complicated. If the swing center 3 is separated from the second lens unit 2 beyond the upper limit, the aberration correcting effect decreases, and an effect corresponding to the driving mechanism cannot be obtained. In this case, the antivibration function is preferably effected by shifting the second lens unit 2 in a direction perpendicular to the optical axis rather than swinging the second lens unit 2 about a remote swing center because the mechanism can be simplified.

In this embodiment, by determining the power arrangement of the objective optical system under the above conditions, excellent image performance and high antivibration sensitivity can be obtained while a space for the image inverting system and antivibration driving mechanism system is ensured.

In addition, in order to obtain high cost performance with a small number of components while maintaining high optical performance, each lens unit constituting the objective lens part is desired as follow in this embodiment.

(a) The first lens unit 1 is formed by arranging a positive lens with its convex surface facing the object side and a negative lens with its concave surface facing the image side from the objective side in the order named.

(b) The second lens unit 2 is formed by a positive lens having a strong convex surface facing the object side.

(c) The first lens unit 1 is formed by a cemented lens of positive and negative lenses.

With the arrangement of the first lens unit 1 in which the positive and negative lenses are arranged in the order named as in "(a)", the position of the principal point of the first lens unit 1 can be set to be closer to the object side than the lens, the distance between the first and second lens units need not be unnecessarily large. In addition, in correcting aberrations in antivibration operation, since the lens surfaces of the respective lenses constituting the first lens unit 1 are substantially concentrically arranged with respect to the swing center of the second lens unit 2, the occurrence of coma due to antivibration operation and the like can be suppressed.

Furthermore, in optimally shaping the second lens unit 2 to locate the swing center 3 on the image side of the second lens unit 2 and the object side of the image inverting system, it is advantageous to shape the object-side surface of the positive lens into a surface close to concentric circles as in "(b)". If, however, the object-side surface of the second lens unit 2 is shaped into perfect concentric circles, the effect of moving an image for antivibration can only be obtained from the image-side surface. A balance needs to be achieved to ensure high sensitivity in antivibration operation while correcting aberrations.

By forming the first lens unit 1 using a cemented lens as in "(c)", the sensitivity in manufacturing the first lens unit 1 can be reduced.

The following are numerical embodiments. In each numerical embodiment, let ri be the radius of curvature of the ith surface from the object side, di be the thickness or air gap of the ith optical member from the object side, and ni and vi be the refractive index and Abbe number, respectively, of the glass of the ith lens from the object side.

<Numerical Embodiment 1>

| | | | |
|---|---|---|---|
| r1 = 40.057 | d1 = 2.97 | n1 = 1.51633 | v1 = 64.1 |
| r2 = 58.056 | d2 = 1.80 | n2 = 1.67270 | v2 = 32.1 |
| r3 = 34.647 | d3 = 2.70 | | |
| r4 = 43.502 | d4 = 3.13 | n3 = 1.51633 | v3 = 64.1 |
| r5 = −588.602 | d5 = 53.40 | | |
| r6 = ∞ | d6 = 16.00 | n4 = 1.56883 | v4 = 56.4 |
| r7 = ∞ | d7 = 16.00 | n5 = 1.56883 | v5 = 56.4 |
| r8 = ∞ | d8 = 16.00 | n6 = 1.56883 | v6 = 56.4 |
| r9 = ∞ | d9 = 16.00 | n7 = 1.56883 | v7 = 56.4 |
| r10 = ∞ | d10 = 3.69 | | |
| r11 = −11.414 | d11 = 7.10 | n8 = 1.69680 | v8 = 55.5 |
| r12 = −12.339 | d12 = 12.56 | | |
| r13 = −45.932 | d13 = 1.62 | n9 = 1.84666 | v9 = 23.8 |
| r14 = 19.645 | d14 = 8.07 | n10 = 1.71300 | v10 = 53.9 |
| r15 = −16.788 | d15 = 0.20 | | |
| r16 = 17.999 | d16 = 3.77 | n11 = 1.69680 | v11 = 55.5 |
| r17 = 103.694 | d17 = 13.50 | | |
| rotation center Tc = 25 mm | | | |

<Numerical Embodiment 2>

| | | | |
|---|---|---|---|
| r1 = 43.012 | d1 = 2.97 | n1 = 1.51633 | v1 = 64.1 |
| r2 = 62.298 | d2 = 1.80 | n2 = 1.67270 | v2 = 32.1 |
| r3 = 35.458 | d3 = 2.70 | | |
| r4 = 42.466 | d4 = 3.13 | n3 = 1.51633 | v3 = 64.1 |
| r5 = −354.948 | d5 = 52.34 | | |
| r6 = ∞ | d6 = 16.00 | n4 = 1.56883 | v4 = 56.4 |
| r7 = ∞ | d7 = 16.00 | n5 = 1.56883 | v5 = 56.4 |
| r8 = ∞ | d8 = 16.00 | n6 = 1.56883 | v6 = 56.4 |
| r9 = ∞ | d9 = 16.00 | n7 = 1.56883 | v7 = 56.4 |
| r10 = ∞ | d10 = 3.71 | | |
| r11 = −10.149 | d11 = 6.56 | n8 = 1.71300 | v8 = 53.9 |
| r12 = −10.784 | d12 = 6.72 | | |
| r13 = −15.949 | d13 = 2.52 | n9 = 1.84666 | v9 = 23.8 |
| r14 = 20.741 | d14 = 8.98 | n10 = 1.71300 | v10 = 53.9 |
| r15 = −13.426 | d15 = 7.18 | | |
| r16 = 19.745 | d16 = 3.39 | n11 = 1.69680 | v11 = 55.5 |
| r17 = 1815.623 | d17 = 13.50 | | |
| rotation center Tc = 25 mm | | | |

<Numerical Embodiment 3>

| | | | |
|---|---|---|---|
| r1 = 47.819 | d1 = 3.30 | n1 = 1.51633 | v1 = 64.1 |
| r2 = 71.930 | d2 = 2.00 | n2 = 1.67270 | v2 = 32.1 |
| r3 = 39.989 | d3 = 3.00 | | |
| r4 = 49.519 | d4 = 2.90 | n3 = 1.51633 | v3 = 64.1 |
| r5 = −339.560 | d5 = 58.19 | | |
| r6 = ∞ | d6 = 17.50 | n4 = 1.56883 | v4 = 56.4 |
| r7 = ∞ | d7 = 20.25 | n5 = 1.56883 | v5 = 56.4 |
| r8 = ∞ | d8 = 20.25 | n6 = 1.56883 | v6 = 56.4 |
| r9 = ∞ | d9 = 17.50 | n7 = 1.56883 | v7 = 56.4 |
| r10 = ∞ | d10 = 15.02 | | |
| r11 = −16.613 | d11 = 1.20 | n8 = 1.84666 | v8 = 23.8 |
| r12 = 20.236 | d12 = 8.31 | n9 = 1.77250 | v9 = 49.6 |
| r13 = −16.450 | d13 = 1.00 | | |
| r14 = 30.821 | d14 = 4.09 | n10 = 1.77250 | v10 = 49.6 |
| r15 = −138.382 | d15 = 4.51 | | |
| r16 = 17.191 | d16 = 2.70 | n11 = 1.77250 | v11 = 49.6 |
| r17 = 26.000 | d17 = 14.50 | | |
| rotation center Tc = 20 mm | | | |

<Numerical Embodiment 4>

| | | | |
|---|---|---|---|
| r1 = 42.034 | d1 = 2.75 | n1 = 1.51633 | v1 = 64.1 |
| r2 = 62.379 | d2 = 1.67 | n2 = 1.67270 | v2 = 32.1 |
| r3 = 34.159 | d3 = 2.50 | | |
| r4 = 40.916 | d4 = 2.90 | n3 = 1.51633 | v3 = 64.1 |
| r5 = −251.238 | d5 = 52.41 | | |
| r6 = ∞ | d6 = 16.00 | n4 = 1.56883 | v4 = 56.4 |
| r7 = ∞ | d7 = 16.00 | n5 = 1.56883 | v5 = 56.4 |
| r8 = ∞ | d8 = 16.00 | n6 = 1.56883 | v6 = 56.4 |
| r9 = ∞ | d9 = 16.00 | n7 = 1.56883 | v7 = 56.4 |
| r10 = ∞ | d10 = 6.83 | | |
| r11 = −16.782 | d11 = 2.61 | n8 = 1.80518 | v8 = 25.4 |
| r12 = 15.534 | d12 = 6.65 | n9 = 1.71300 | v9 = 53.9 |
| r13 = −15.767 | d13 = 0.50 | | |
| r14 = −102.738 | d14 = 2.00 | n10 = 1.71300 | v10 = 53.9 |
| r15 = −31.180 | d15 = 0.60 | | |
| r16 = 18.000 | d16 = 18.68 | n11 = 1.77250 | v11 = 49.6 |
| rotation center Tc = 30 mm | | | |

<Numerical Embodiment 5>

| | | | |
|---|---|---|---|
| r1 = 39.918 | d1 = 2.75 | n1 = 1.51633 | v1 = 64.1 |
| r2 = 65.558 | d2 = 1.67 | n2 = 1.67270 | v2 = 32.1 |
| r3 = 35.165 | d3 = 2.50 | | |
| r4 = 40.687 | d4 = 2.90 | n3 = 1.51633 | v3 = 64.1 |
| r5 = −259.733 | d5 = 52.01 | | |
| r6 = ∞ | d6 = 16.00 | n4 = 1.56883 | v4 = 56.4 |
| r7 = ∞ | d7 = 16.00 | n5 = 1.56883 | v5 = 56.4 |
| r8 = ∞ | d8 = 16.00 | n6 = 1.56883 | v6 = 56.4 |
| r9 = ∞ | d9 = 16.00 | n7 = 1.56883 | v7 = 56.4 |
| r10 = ∞ | d10 = 7.74 | | |
| r11 = −7.683 | d11 = 1.00 | n8 = 1.84666 | v8 = 23.8 |
| r12 = 140.592 | d12 = 6.35 | n9 = 1.60311 | v9 = 60.6 |
| r13 = −10.156 | d13 = 0.50 | | |
| r14 = −67.812 | d14 = 4.10 | n10 = 1.71300 | v10 = 53.9 |
| r15 = −22.404 | d15 = 0.33 | | |

-continued

| | | | |
|---|---|---|---|
| r16 = 27.007 | d16 = 3.86 | n11 = 1.69680 | v11 = 55.5 |
| r17 = −358.343 | d17 = 0.17 | | |
| r18 = 15.958 | d18 = 7.46 | n12 = 1.77250 | v12 = 49.6 |
| r19 = 15.000 | d19 = 14.50 | | |
| rotation center Tc = 25 mm | | | |

<Numerical Embodiment 6>

| | | | |
|---|---|---|---|
| r1 = 47.819 | d1 = 3.30 | n1 = 1.51633 | v1 = 64.1 |
| r2 = 71.930 | d2 = 2.00 | n2 = 1.67270 | v2 = 32.1 |
| r3 = 39.989 | d3 = 3.00 | | |
| r4 = 49.519 | d4 = 2.90 | n3 = 1.51633 | v3 = 64.1 |
| r5 = −339.560 | d5 = 58.19 | | |
| r6 = ∞ | d6 = 17.50 | n4 = 1.56883 | v4 = 56.4 |
| r7 = ∞ | d7 = 20.25 | n5 = 1.56883 | v5 = 56.4 |
| r8 = ∞ | d8 = 20.25 | n6 = 1.56883 | v6 = 56.4 |
| r9 = ∞ | d9 = 17.50 | n7 = 1.56883 | v7 = 56.4 |
| r10 = ∞ | d10 = 14.76 | | |
| r11 = −10.807 | d11 = 1.20 | n8 = 1.84666 | v8 = 23.8 |
| r12 = 22.083 | d12 = 8.17 | n9 = 1.77250 | v9 = 49.6 |
| r13 = −14.798 | d13 = 0.60 | | |
| r14 = 118.961 | d14 = 4.56 | n10 = 1.71300 | v10 = 53.9 |
| r15 = −37.367 | d15 = 0.50 | | |
| r16 = 21.371 | d16 = 3.70 | n11 = 1.69680 | v11 = 55.5 |
| r17 = 54.095 | d17 = 2.65 | | |
| r18 = 13.923 | d18 = 2.70 | n12 = 1.71300 | v12 = 53.9 |
| r19 = 13.544 | d19 = 14.50 | | |
| rotation center Tc = 50 mm | | | |

Table 1 shows the relationship between the respective conditional expressions described above and the numerical values in the respective numerical embodiments.

TABLE 1

| | Embodiment 1 | Embodiment 2 | Embodiment 3 | Embodiment 4 | Embodiment 5 | Embodiment 6 |
|---|---|---|---|---|---|---|
| −Fo/f1 | 0.335 | 0.401 | 0.390 | 0.422 | 0.424 | 0.390 |
| Fo/f2 | 1.381 | 1.441 | 1.430 | 1.459 | 1.463 | 1.430 |
| D12/Fo | 0.025 | 0.025 | 0.025 | 0.025 | 0.025 | 0.025 |
| Tc/Fo | 0.230 | 0.236 | 0.167 | 0.301 | 0.250 | — |

Figure 7:
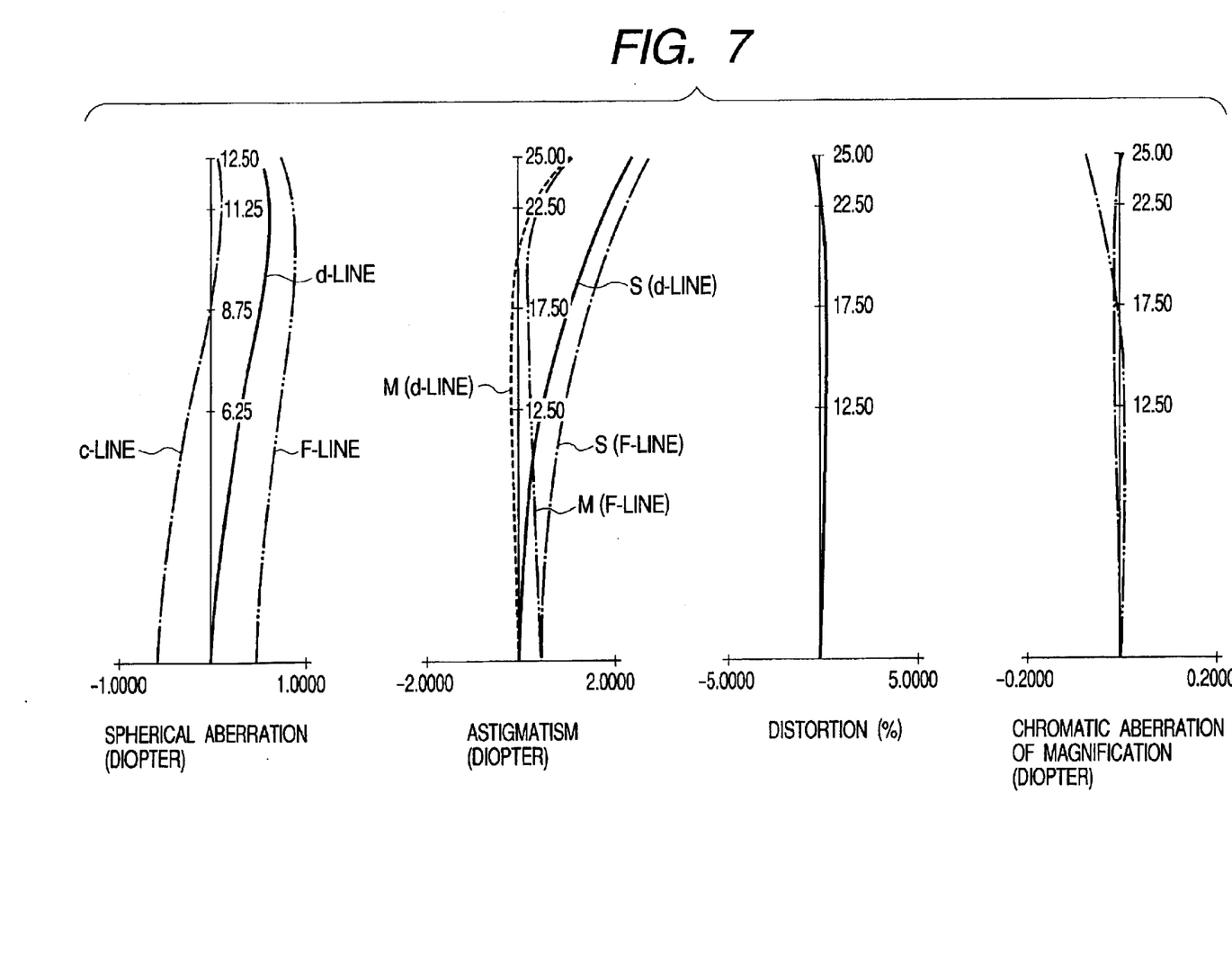
FIG. 7 is an aberration diagram corresponding to the observation optical system according to numerical embodiment 1 in the embodiment of the present invention.
Figure 8:
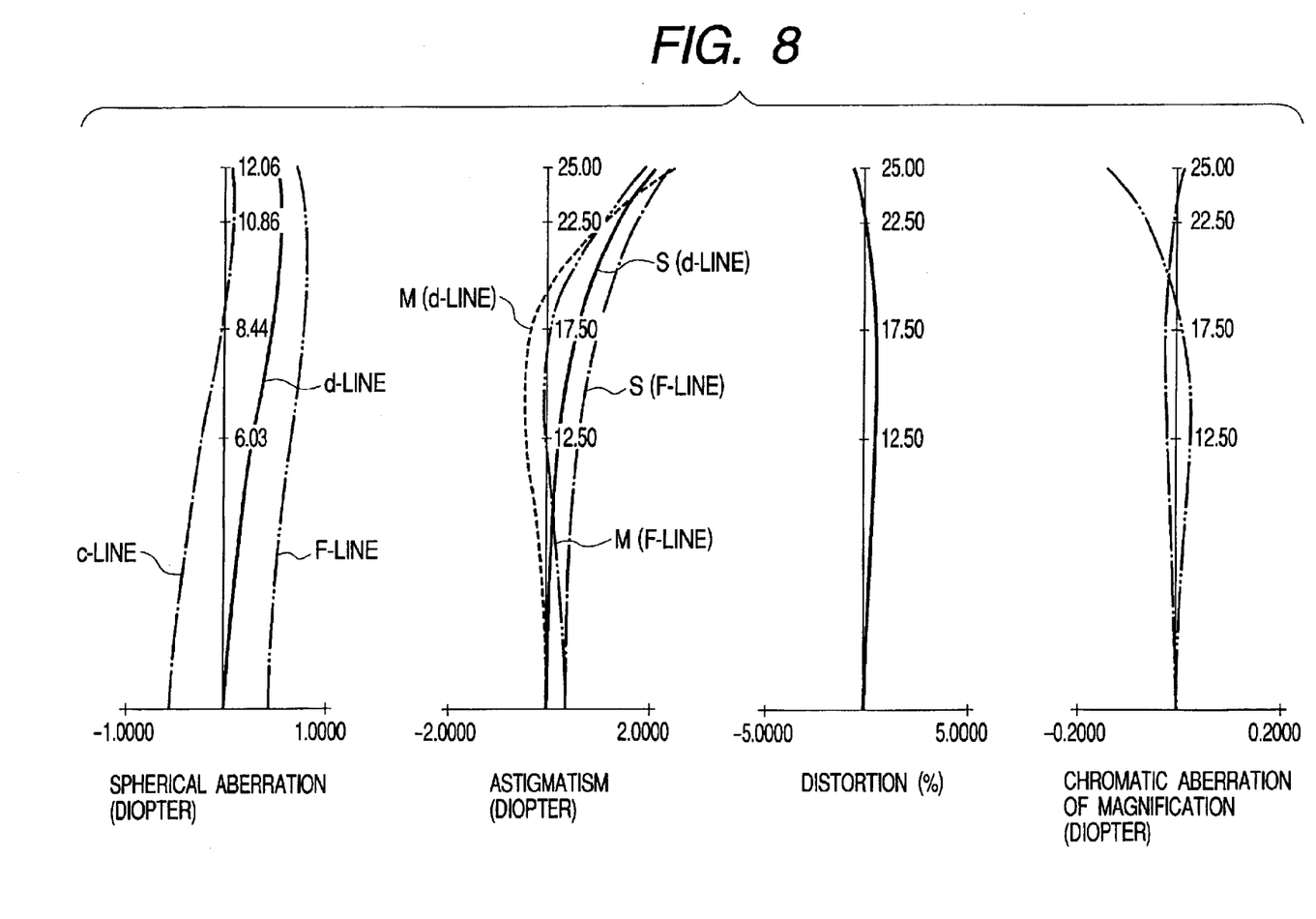
FIG. 8 is an aberration diagram corresponding to the observation optical system according to numerical embodiment 2 in the embodiment of the present invention.
Figure 9:
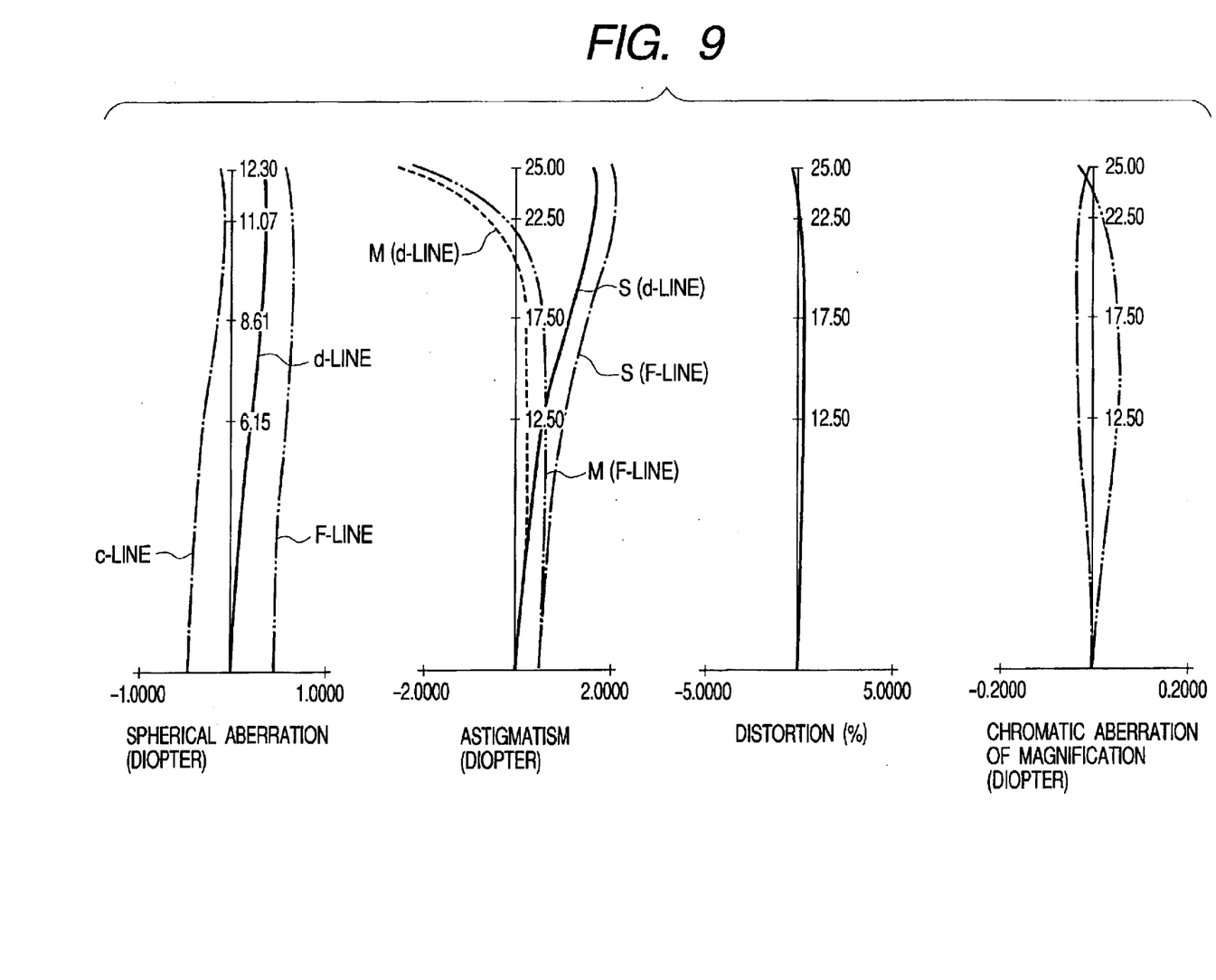
FIG. 9 is an aberration diagram corresponding to the observation optical system according to numerical embodiment 3 in the embodiment of the present invention.
Figure 10:
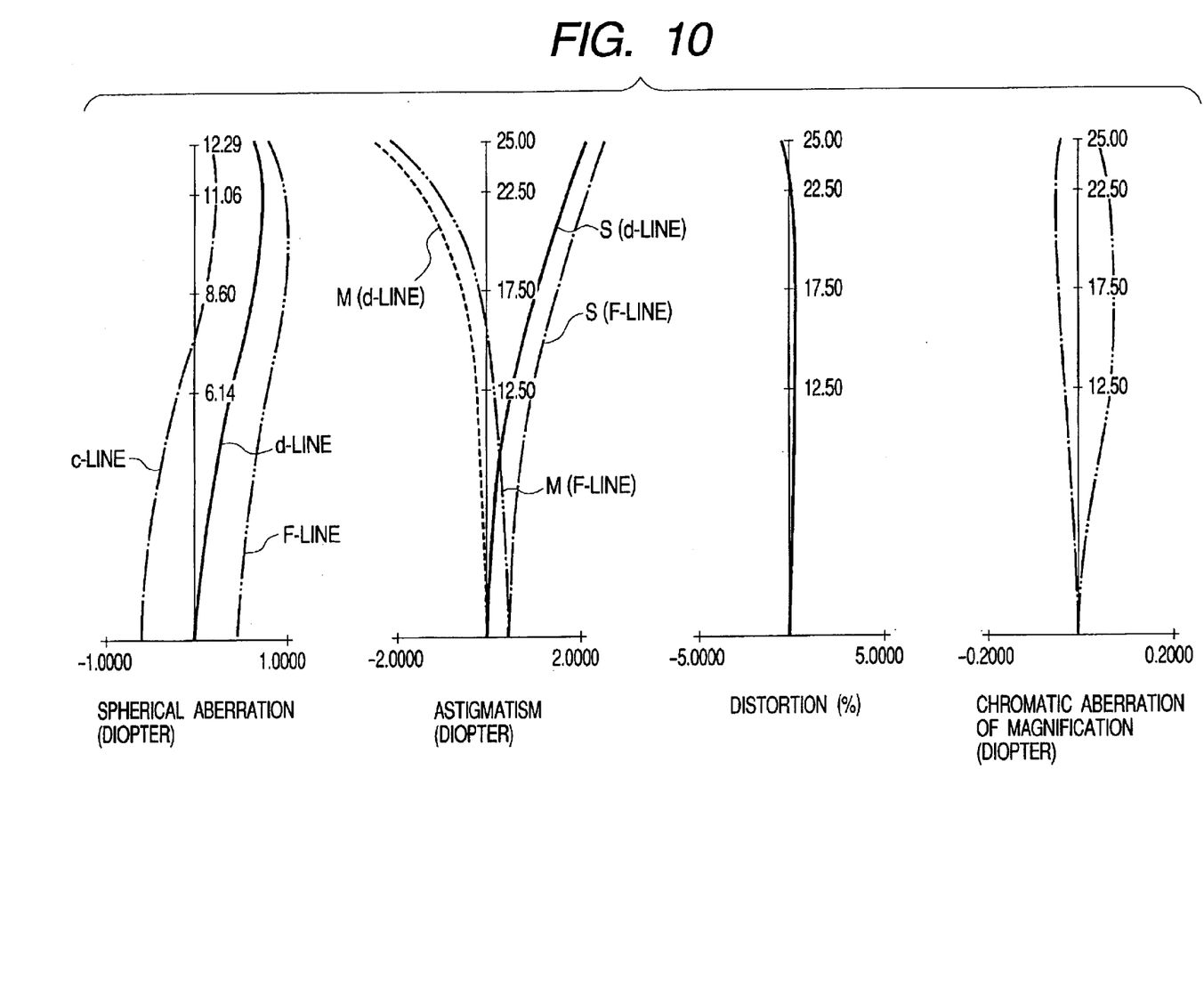
FIG. 10 is an aberration diagram corresponding to the observation optical system according to numerical embodiment 4 in the embodiment of the present invention.
Figure 11:
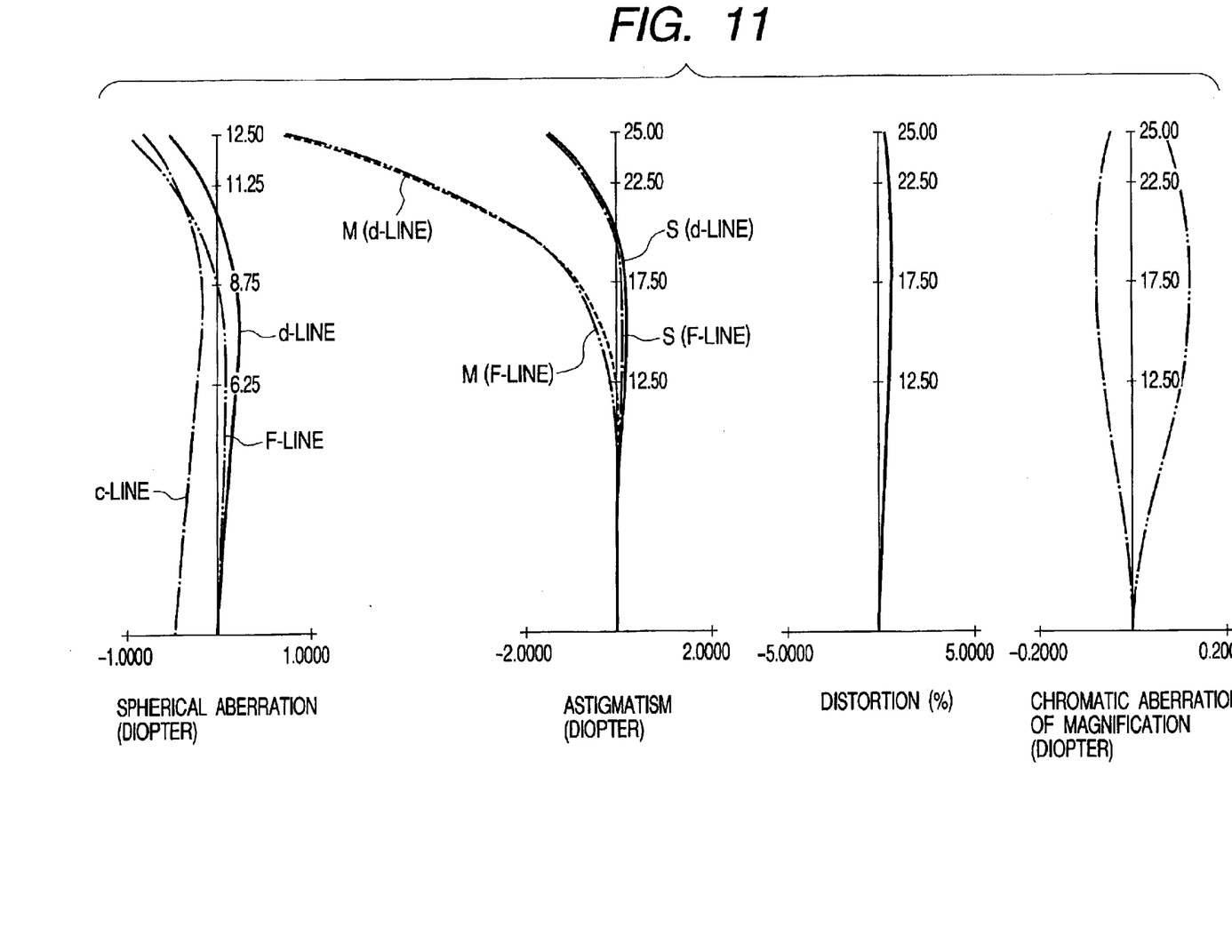
FIG. 11 is an aberration diagram corresponding to the observation optical system according to numerical embodiment 5 in the embodiment of the present invention.
Figure 12:
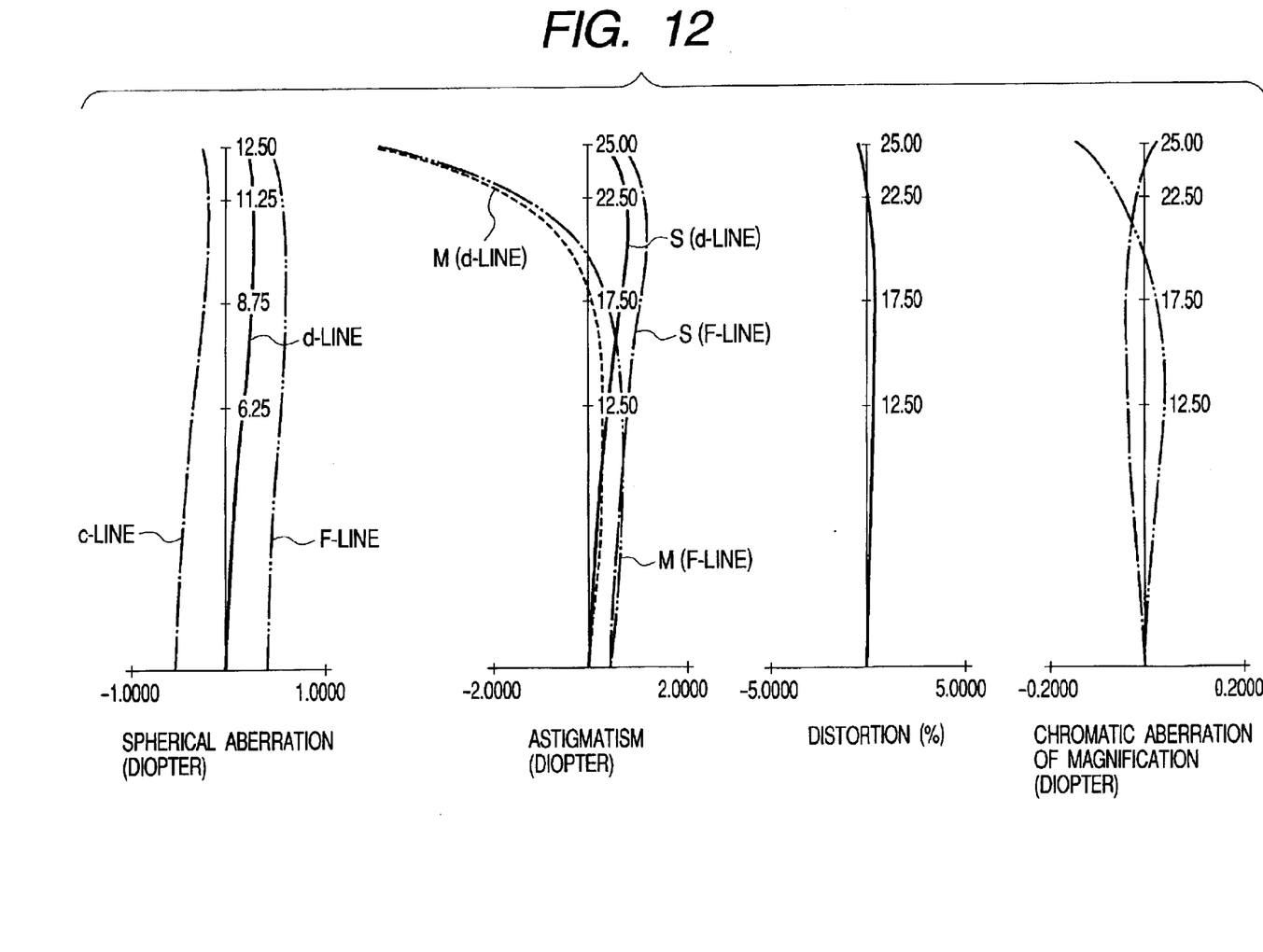
FIG. 12 is an aberration diagram corresponding to the observation optical system according to numerical embodiment 6 in the embodiment of the present invention.

FIGS. 7 to 12 are aberration diagrams of the observation optical systems according to numerical embodiments 1 to 6.

This embodiment has exemplified the case where the second lens unit 2 is swung about a point on the optical axis 5 to effect the antivibration function. However, the present invention can also be applied to a case where the second lens unit 2 is shifted/driven in a direction perpendicular to the optical axis 5 to effect the antivibration function. The arrangement based on numerical embodiment 6 shown in FIG. 6, in particular, is designed to realize excellent image performance and antivibration function in either of the driving mechanisms.

What is claimed is:

1. An observation optical system comprising:
an objective optical part which forms an image of an object, and has a first lens unit with a negative power and a second lens unit with a positive power arranged from an object side in the order named, said second lens unit being capable of swinging about a point on the optical axis to stabilize an image;
an image inverting part which converts an image formed by said objective optical part into an erect image; and
an eyepiece optical part which guides the erect image converted by said image inverting part to an observer, wherein letting β be a magnification of said second lens unit, an antivibration sensitivity Si of said second lens unit satisfies a condition defined by $|Si|=|1-\beta|>1$.

2. An observation optical system according to claim 1, comprising:
wherein letting Fo be a focal length of the overall objective optical part, f1 be a focal length of said first lens unit, f2 be a focal length of said second lens unit, and D12 be a distance between said first lens unit and said second lens unit, conditions defined by $0.1 \leq -Fo/f1 \leq 1.0$ $1.1 \leq Fo/f2 \leq 3.0$ $0.01 \leq D12/Fo \leq 0.2$ are satisfied.

3. A system according to claim 1, wherein said first lens unit consists of one positive lens element and one negative lens element, and said second lens unit consists of one positive lens element.

4. A system according to claim 3, wherein said first lens unit has a positive lens element with a convex surface facing the object side and a negative lens element with a concave surface facing the image side which are arranged from the object side in the order named.

5. A system according to claim 3, wherein said first lens unit consists of a lens component formed by cementing the positive lens element to the negative lens element.

6. A system according to claim 3, wherein said second lens unit consists of a positive lens element having a convex surface facing the object side.

7. An observation optical system comprising:
an objective optical part which forms an image of an object, and has a first lens unit with a negative power and a second lens unit with a positive power arranged from an object side in the order named, said second lens unit being capable of swinging about a point on the optical axis to stabilize an image;
an image inverting part which converts an image formed by said objective optical part into an erect image; and
an eyepiece optical part which guides the erect image converted by said image inverting part to an observer, wherein, letting Fo be a focal length of the overall objective part and Tc be a distance from a vertex of an object-side surface of said second lens unit to a swing center (when an image direction is a positive direction), the condition defined by $0.1 \leq Tc/Fo \leq 0.7$ is satisfied.

8. The sytem according to claim 7, wherein letting f1 be a focal length of said first unit, f2 be a focal length of said second lens unit, and D12 be a distance between said first and said second lens unit, conditions defined by $0.1 \leq -Fo/f1 \leq 1.0$ $1.1 \leq Fo/f2 \leq 3.0$ $0.01 \leq D12/Fo \leq 0.2$ are satisfied.

* * * * *